(12) United States Patent
Ramnathkar

(10) Patent No.: US 10,404,826 B2
(45) Date of Patent: *Sep. 3, 2019

(54) CONTENT BASED ROUTING ARCHITECTURE SYSTEM AND METHOD

(71) Applicant: Walmart Apollo, LLC, Bentonville, AR (US)

(72) Inventor: Sandesh N. Ramnathkar, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/673,150

(22) Filed: Aug. 9, 2017

(65) Prior Publication Data
US 2017/0353581 A1    Dec. 7, 2017

Related U.S. Application Data

(63) Continuation of application No. 14/935,411, filed on Nov. 8, 2015, now Pat. No. 9,762,695, which is a continuation of application No. 14/054,433, filed on Oct. 15, 2013, now Pat. No. 9,185,021.

(60) Provisional application No. 61/714,094, filed on Oct. 15, 2012.

(51) Int. Cl.
| | | |
|---|---|---|
| *G06F 15/16* | (2006.01) |
| *H04L 29/08* | (2006.01) |
| *H04L 12/701* | (2013.01) |
| *H04L 12/64* | (2006.01) |
| *H04L 29/12* | (2006.01) |
| *H04L 29/06* | (2006.01) |
| *H04L 12/723* | (2013.01) |
| *H04L 12/721* | (2013.01) |
| *H04L 12/725* | (2013.01) |

(52) U.S. Cl.
CPC ......... *H04L 67/32* (2013.01); *H04L 12/6418* (2013.01); *H04L 45/00* (2013.01); *H04L 61/10* (2013.01); *H04L 69/22* (2013.01); *H04L 45/308* (2013.01); *H04L 45/38* (2013.01); *H04L 45/44* (2013.01); *H04L 45/502* (2013.01)

(58) Field of Classification Search
CPC ..... H04L 67/32; H04L 12/6418; H04L 45/00; H04L 61/10; H04L 69/22; H04L 45/308; H04L 45/38; H04L 45/44; H04L 45/502
See application file for complete search history.

(56) References Cited

U.S. PATENT DOCUMENTS

| | | | | |
|---|---|---|---|---|
| 7,308,477 B1 * | 12/2007 | Gress | ...................... | H04L 51/36 379/277 |
| 7,325,127 B2 * | 1/2008 | Olkin | ...................... | H04L 51/30 713/152 |
| 7,627,635 B1 * | 12/2009 | Logue | ...................... | H04L 51/12 709/206 |

(Continued)

OTHER PUBLICATIONS

USPTO; U.S. Appl. No. 14/054,433; Notice of Allowance dated Jul. 6, 2015.

(Continued)

*Primary Examiner* — Moustafa M Meky
(74) *Attorney, Agent, or Firm* — Fitch, Even, Tabin & Flannery LLP

(57) ABSTRACT

The present general inventive concept relates to systems and method for routing electronic messages depending on message content.

19 Claims, 2 Drawing Sheets

Logical Flow of Message
(Canonical – Proprietary)

(56) References Cited

U.S. PATENT DOCUMENTS

| | | | |
|---|---|---|---|
| 7,774,411 B2* | 8/2010 | LeMay | H04L 63/045 |
| | | | 709/206 |
| 7,908,293 B2 | 3/2011 | Aronson | |
| 8,032,898 B2* | 10/2011 | Hunt | G06F 9/545 |
| | | | 719/319 |
| 8,068,609 B2* | 11/2011 | Puranik | H04L 63/062 |
| | | | 370/338 |
| 8,073,910 B2* | 12/2011 | Tokuda | G06Q 10/107 |
| | | | 709/206 |
| 8,353,452 B2 | 1/2013 | Sharpe | |
| 8,583,912 B2* | 11/2013 | Ishikawa | H04L 9/0833 |
| | | | 380/260 |
| 8,701,128 B2 | 4/2014 | Salt | |
| 8,931,098 B2* | 1/2015 | Yoshioka | H04L 51/12 |
| | | | 380/229 |
| 9,111,314 B2* | 8/2015 | Katzin | G06Q 30/06 |
| 9,185,021 B1* | 11/2015 | Rannnathkar | H04L 12/6418 |
| 9,762,695 B2* | 9/2017 | Ramnathkar | H04L 12/6418 |
| 2007/0282703 A1 | 12/2007 | Sharpe | |
| 2008/0270438 A1 | 10/2008 | Aronson | |
| 2009/0172695 A1 | 7/2009 | Lazaroff | |
| 2012/0204032 A1 | 8/2012 | Wilkins | |
| 2012/0210335 A1 | 8/2012 | Salt | |
| 2012/0331074 A1 | 12/2012 | Fox | |
| 2013/0215442 A1 | 8/2013 | Sato | |
| 2013/0305367 A1 | 11/2013 | Yoshioka | |
| 2014/0237063 A1 | 8/2014 | Yoon | |
| 2015/0170259 A1 | 6/2015 | Katzin | |

OTHER PUBLICATIONS

USPTO; U.S. Appl. No. 14/935,411; Notice of Allowance dated May 19, 2017.
USPTO; U.S. Appl. No. 14/935,411; Office Action dated Nov. 30, 2016.

* cited by examiner

Logical Flow of Message
(Canonical – Proprietary)

CONTENT BASED ROUTING ARCHITECTURE SYSTEM AND METHOD

CROSS-REFERENCE TO RELATED APPLICATIONS

This application is a continuation of U.S. application Ser. No. 14/935,411, filed Nov. 8, 2015, entitled CONTENT BASED ROUTING ARCHITECTURE SYSTEM AND METHOD, which is a continuation of U.S. application Ser. No. 14/054,433, filed Oct. 15, 2013, entitled CONTENT BASED ROUTING ARCHITECTURE SYSTEM AND METHOD, which claims priority to U.S. Provisional Application Ser. No. 61/714,094, filed Oct. 15, 2012, entitled, "CONTENT BASED ROUTING ARCHITECTURE SYSTEM AND METHOD," all of which are incorporated herein by reference in their entirety.

FIELD

The present inventive concept relates to a service-oriented architecture (SOA) system and related methods. In particular, the present inventive concept relates to a content-based routing architecture system and related methods.

BACKGROUND

Within the general field of SOA, an Enterprise Service Bus (ESB) is used to provide seamless integration between a source service consumer(s) (e.g. client requests) and a target service provider(s) (e.g., answering services). An exemplary ESB that is well-known in the art is capable of handling conversion between different protocols, data transformation and mapping, and translation. An exemplary ESB that is well-known in the art is also capable of routing message exchange between services. The ESB will commonly resolve contention (errors) between communicating services, and control deployment of services.

In a common retail environment, the ESB that is well-known in the art includes at least two features. First, the ESB is capable of sending and receiving electronic messages (e.g., orders, instructions, requests, payments, payment information, and/or other information) to and from one or more source service consumer(s). Some examples of service consumers in an online retail environment include order, payment, inventory, or any business-to-business placement software application. These messages may be in any number of different formats/protocols. Second, the ESB is capable of sending and receiving electronic messages to and from one or more target service provider(s). One example of a target service provider in an online retail environment is an order fulfillment software application.

The ESB may be required to perform a number of complex activities and data/message flow routes. These complex activities and data/message flow routing are based on information/data within each message. Complexity of the system often leads to repetition and redundancies, which in turn lead to reduced efficiencies and increased times for testing and development.

Systems of the prior art inevitably include multiple different software applications that are designed to carry out the same set of instructions and are different only in that each is specifically designed to communicate and interact with a specific format or protocol. In the event that a new software application is introduced into the system employing a new message format or protocol, a whole new ESB solution is required to be designed to address the new format/protocol, even though fundamental purpose and actions remain unchanged.

What is needed in the art is a system and related methods that address these and other shortcomings of the prior art.

SUMMARY

The present inventive concept provides a flexible solution to configure different service design patterns and route appropriately to different target systems based on supported protocol in Service Oriented Architecture. The routing of each individual message is dependent on the content of that message.

One object of the present inventive concept is to provide a system for routing electronic messages. The system includes one or more computer server with computer-readable code for carrying out the following instructions: An electronic request message is received by an ESB from a service consumer, such as a remote computer terminal, server, or other similar system. The request message is analyzed to determine whether certain predetermined header information is included with the message. If not, the predetermined header information is added to the message. A list of instructions is generated that includes message-specific service details. The individual instructions for the list of instructions are selected from one or more database and are message-specific based on each specific request message. The list of instructions is analyzed to determine whether translation or data transformation is required and, if required, the data transformation and/or translation are performed. The message is routed to a service provider. A response message is received by the ESB from the service provider. The response message is analyzed to determine whether translation or data transformation is required. If required, the translation and/or data transformation is performed. The response message is delivered to the service consumer.

Another object of the present inventive concept is to provide a method for routing electronic messages. The method includes receiving an electronic request message by an ESB from a service consumer, such as a remote computer terminal, server, or other similar system. The request message is analyzed to determine whether certain predetermined header information is included with the message. If not, the predetermined header information is added to the message. A list of instructions is generated that includes message-specific service details. The individual instructions for the list of instructions are selected from one or more database and are message-specific based on each specific request message. The list of instructions is analyzed to determine whether translation or data transformation is required and, if required, the data transformation and/or translation are performed. The message is routed to a service provider. A response message is received by the ESB from the service provider. The response message is analyzed to determine whether translation or data transformation is required. If required, the translation and/or data transformation is performed. The response message is delivered to the service consumer.

The foregoing and other objects are intended to be illustrative of the general inventive concept and are not meant in a limiting sense. Many possible embodiments of the invention may be made and will be readily evident upon a study of the entire specification and accompanying drawings comprising a part thereof. Various features and subcombinations of the general inventive concept may be employed without reference to other features and subcombinations. Other objects and advantages of the general inventive concept will become apparent from the following description taken in connection with the accompanying drawings, wherein is set forth by way of illustration and example, an embodiment of this invention and various features thereof.

BRIEF DESCRIPTION OF THE DRAWINGS

These and/or other aspects and utilities of the present general inventive concept will become apparent and more readily appreciated from the following description of the embodiments, taken in conjunction with the accompanying drawings. For the purpose of illustration, forms of the present general inventive concept which are presently preferred are shown in the drawings; it being understood, however, that the general inventive concept is not limited to the precise arrangements and instrumentalities shown. In the drawings.

DETAILED DESCRIPTION

The present general inventive concept provides a system and related methods for routing electronic messages based on message content.

Figure 1:
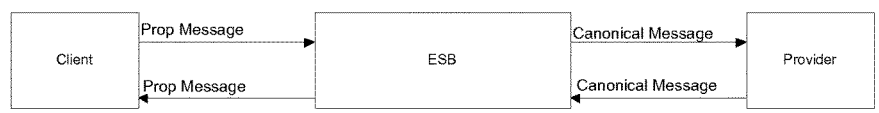
FIG. 1 is an exemplary embodiment of the present general inventive concept where an ESB is used to route messages between a client and service provider.
Figure 2:
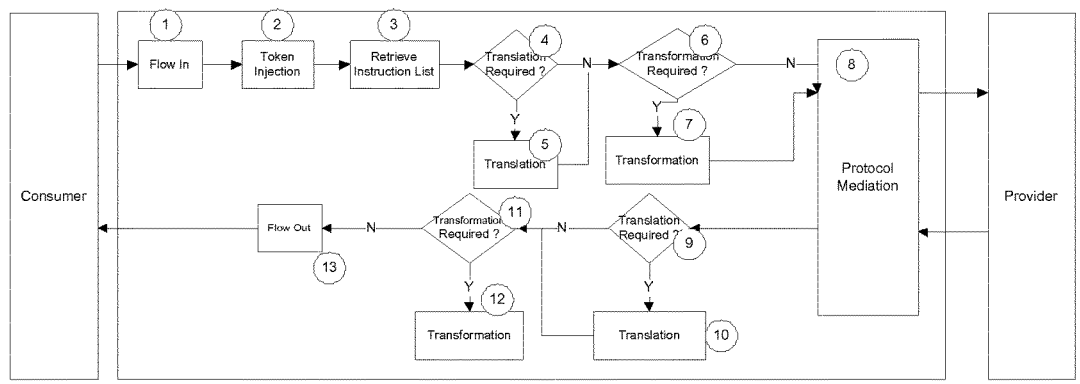
FIG. 2 is an exemplary embodiment of the present general inventive concept.

Referring to FIG. 1, an exemplary embodiment of the present general inventive concept is provided. As shown in FIGS. 1 and 2, an ESB of the present inventive concept has the capability to send and receive electronic message communications with any existing legacy software application, both service consumers and target service providers. As legacy software applications are phased out or as new software applications are added in, the ESB of the present inventive concept remains capable of translating, transforming, converting and routing the electronic messages, as needed.

A system of the present inventive concept comprises one or more server with an operating system and running a message queuing software application (i.e., an ESB). In an exemplary embodiment, the system comprises a plurality of servers with a LINUX operating system and running WEBSPHERE MESSAGE BROKER software. Preferred embodiments also include client computers in electronically networked communication with the server(s).

The system includes several nodes at which various different instructions and actions are carried out. The instructions and actions of the various nodes are discussed below.

A method of the present inventive concept may be performed on the system described above and comprises the following steps.

Node 1

Referring to FIG. 2, in a first step (node 1), an electronic request message is received by an ESB from a service consumer, to be routed to a service provider. In an exemplary embodiment shown in FIG. 3, the request message is a JAVA Message Service (JMS) request message and it is sent from a remote service consumer, such as a client computer terminal over an electronic communication network.

Node 2

Referring to FIG. 2, in a second step (node 2) (token injection), the request message is analyzed to determine whether it is "proprietary" or "canonical." A "canonical" message is one that includes header information in a standardized and predetermined format and structure. A "proprietary" message is a legacy, historical, or otherwise non-standardized message that lacks header information in the standardized and predetermined format and structure of a "canonical" message. In the event that the request message is "proprietary" (i.e. lacks proper header information), appropriate header information in a standardized and predetermined format and structure is added to the request message.

Node 3

Referring to FIG. 2, in a third step (node 3), a list of instructions is generated with message-specific details. The structure of the list of instructions is pre-defined. The list of instructions is derived from any combination of one or more database(s) and/or XML. In some embodiments, the list of instructions includes multiple steps describing how the message is going to flow, in what sequence, and in what format. Message-specific service details are loaded to the list of instructions. The essential message-specific service details that are loaded to the list of instructions include: (a) the name of the service requested, (b) the version of the service requested, (c) the operation of the service requested, and (d) a route key. In some embodiments, additional message-specific service details are loaded to the list of instructions. The route key defines the current and next destination of the message.

Node 4

Referring to FIG. 2, in a fourth step (node 4), the request message is analyzed to determine whether translation is required based on the list of instructions. In the event that translation is required, the computer instructions of node 5 (below) are applied. In the event that translation is not required, the computer instructions of node 6 (below) are applied, thus bypassing node 5.

Node 5

Referring to FIG. 2, in a fifth step (node 5), translation logic is applied to the request message such that the message is translated.

Node 6

Referring to FIG. 2, in a sixth step (node 6), the request message is analyzed to determine whether data transformation is required. Whether data transformation is required is determined based on the list of instructions. In the event that data transformation is required, the computer instructions of node 7 (below) are applied. In the event that data transformation is not required, the computer instructions of node 8 (below) are applied, thus bypassing node 7.

Node 7

Referring to FIG. 2, in a seventh step (node 7), data transformation logic is applied to the request message such that the message data are transformed.

Node 8

Referring to FIG. 2, in an eighth step (node 8), the request message is routed to the proper service provider based on the list of instructions route key. Additionally, an electronic response message is received by the ESB from the service provider, to be routed to the service consumer. The response message includes a list of instructions, similar to the list of instructions generated in node 3 (discussed above). However, the message-specific service details of the response message differ from the message-specific service details of the request message.

Node 9

Referring to FIG. 2, in a ninth step (node 9), the response message is analyzed to determine whether translation is required based on the response message list of instructions. In the event that translation is required, the computer instructions of node 10 (below) are applied. In the event that translation is not required, the computer instructions of node 11 (below) are applied, thus bypassing node 10.

Node 10

Referring to FIG. 2, in a tenth step (node 10), translation logic is applied to the response message such that the message is translated.

Node 11

Referring to FIG. 2, in an eleventh step (node 11), the response message is analyzed to determine whether data transformation is required. Whether data transformation is required is determined based on the list of instructions. In the event that data transformation is required, the computer instructions of node 12 (below) are applied. In the event that data transformation is not required, the computer instructions of node 13 (below) are applied, thus bypassing node 12.

Node 12

Referring to FIG. 2, in a twelfth step (node 12), data transformation logic is applied to the response message such that the message data are transformed.

Node 13

Referring to FIG. 2, in a thirteenth step (node 13), the response message is delivered to the service consumer.

Figure 3:
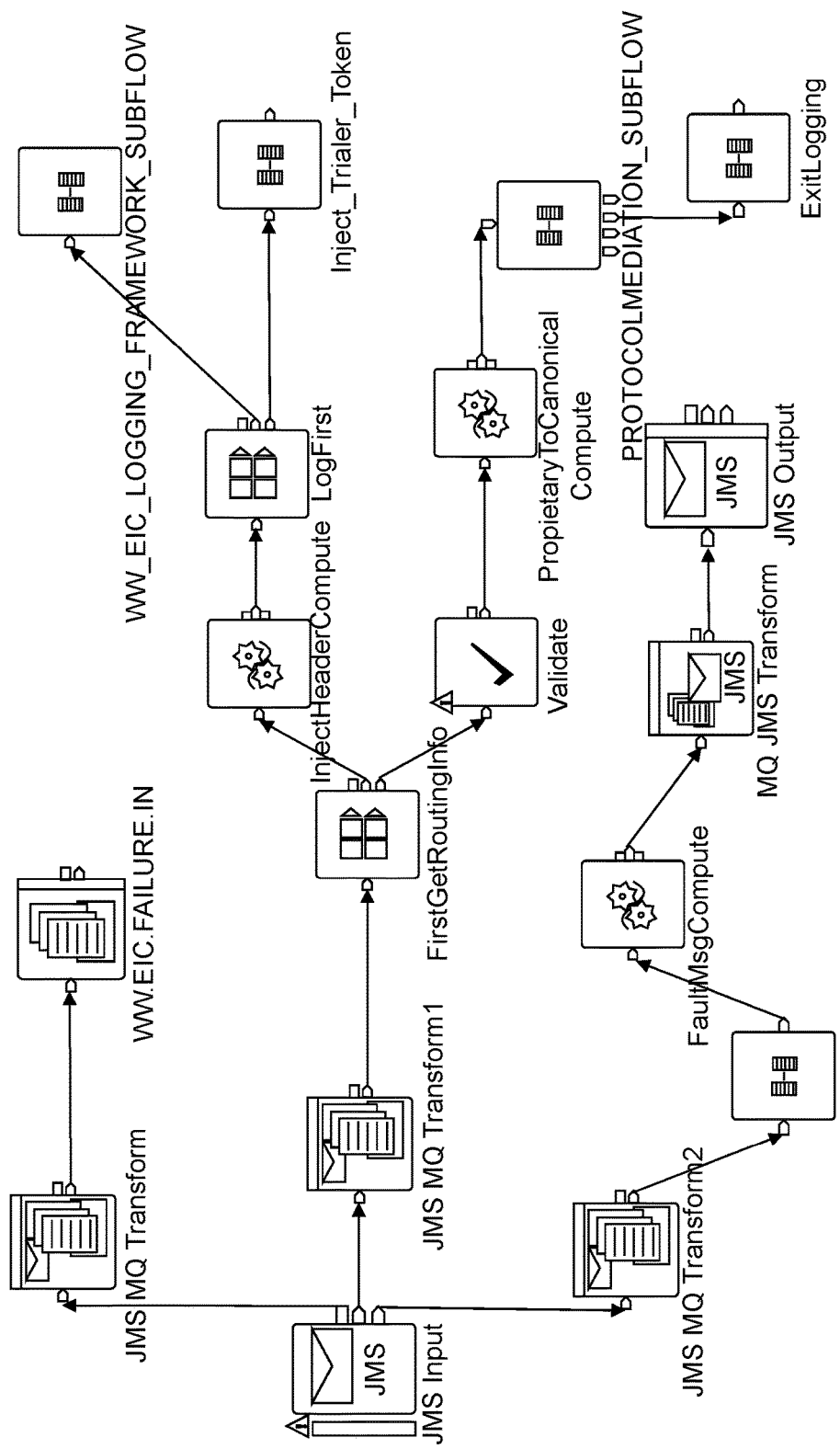
FIG. 3 provides message flow design in an exemplary embodiment of the present general inventive concept.

Referring to FIG. 3, an electronic message flow diagram of an exemplary embodiment of the present general inventive concept is provided. Every electronic message received by the ESB is routed appropriately based on the content of the message in accordance with the instructions and actions described and referred to in the flow diagram of FIG. 3. The instructions and actions of each step have been previously described, above.

The exemplary embodiments of the present general inventive concept are implemented as a software algorithm, e.g., computer readable codes, on a computer readable medium. Various other embodiments of the present general inventive concept can be embodied as computer readable codes on a computer readable medium and/or computer readable recording medium (collectively "computer readable recording medium" hereafter). The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

Thus, while the present general inventive concept has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use; applications in contexts outside retail sales; and operations in a form other than retail order fulfillment.

It is also to be understood that the claims to follow are or will be intended to cover all of the generic and specific features of the invention herein described, and all statements of the scope of the invention which, as a matter of language, might be said to fall therebetween. Hence, the proper scope of the present general inventive concept should be determined only by the broadest interpretation of such claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A system for routing electronic messages comprising one or more computer servers with computer-readable code for carrying out the following instructions:

receiving an electronic request message by an Enterprise Service Bus (ESB) from a service consumer;

determining whether said electronic request message is proprietary or canonical, where a canonical message includes header information in a predetermined canonical format, and a proprietary message either lacks header information or includes header information different from the predetermined canonical format;

when said request message is proprietary, adding header information in said predetermined canonical format to said request message;

generating a request message list of instructions comprising message-specific service details comprising:

a route key defining at least a next destination of the message;

analyzing said list of instructions to determine whether translation is required;

applying translation logic to the request message when the translation is required; and routing said request message to a service provider based on the route key of the request message list of instructions.

2. The system of claim 1, wherein said service consumer is a remote client terminal in electronically networked communication with said one or more computer servers.

3. The system of claim 1, wherein said electronic request message is a JAVA Message Service.

4. The system of claim 1, wherein the one or more computer servers are further configured to carry out the following instructions:

receiving an electronic response message by the ESB from the service provider, said response message comprising a response message list of instructions;

analyzing said response message list of instructions to determine whether translation is required;

applying translation logic to the response message when translation is required; and delivering said response message to said service consumer.

5. The system of claim 4, wherein the one or more computer servers are further configured to carry out the following instructions:
 analyzing said response message list of instructions to determine whether data transformation is required; and
 applying data transformation logic to the response message when data transformation is required prior to delivering said response message.

6. The system of claim 1, wherein the one or more computer servers are further configured to carry out the following instructions:
 receiving an electronic response message by the ESB from the service provider, said response message comprising a response message list of instructions;
 analyzing said response message list of instructions to determine whether data transformation is required;
 applying data transformation logic to the response message when data transformation is required; and
 delivering said response message to said service consumer.

7. The system of claim 1, wherein the message-specific service details comprise one or more of:
 a name of a service requested;
 a version of the service requested;
 an operation of the service requested; and
 wherein said message-specific service details is acquired from a database based on the request message.

8. The system of claim 1, further comprising:
 analyzing said list of instructions to determine whether data transformation is required; and
 applying data transformation logic to the request message when the data transformation is required.

9. The system of claim 1, wherein the request message list of instructions comprises at least one step describing how the request message is to flow, in what sequence, and in what format.

10. A method of routing electronic messages, said method comprising the steps of:
 receiving an electronic request message by an Enterprise Service Bus (ESB) from a service consumer;
 determining whether said electronic request message is proprietary or canonical, where a canonical message includes header information in a predetermined canonical format, and a proprietary message either lacks header information or includes header information different from the predetermined canonical format;
 when said request message is proprietary, adding header information in said predetermined canonical format to said request message;
 generating a request message list of instructions comprising message-specific service details comprising:
  a route key defining at least a next destination of the message;
 analyzing said list of instructions to determine whether translation is required;
 applying translation logic to the request message when the translation is required; and
 routing said request message to a service provider based on the route key of the request message list of instructions.

11. The method of claim 10, wherein said service consumer is a remote client terminal in electronically networked communication with said one or more computer servers.

12. The method of claim 10, wherein said electronic request message is a JAVA Message Service.

13. The method of claim 10, further comprising:
 receiving an electronic response message by the ESB from the service provider, said response message comprising a response message list of instructions;
 analyzing said response message list of instructions to determine whether translation is required;
 applying translation logic to the response message when translation is required; and
 delivering said response message to said service consumer.

14. The method of claim 13, further comprising:
 analyzing said response message list of instructions to determine whether data transformation is required; and
 applying data transformation logic to the response message when data transformation is required prior to delivering said response message.

15. The method of claim 10, further comprising:
 receiving an electronic response message by the ESB from the service provider, said response message comprising a response message list of instructions;
 analyzing said response message list of instructions to determine whether data transformation is required;
 applying data transformation logic to the response message when data transformation is required; and
 delivering said response message to said service consumer.

16. The method of claim 10, wherein the message-specific service details comprise one or more of:
 a name of a service requested;
 a version of the service requested;
 an operation of the service requested; and
 wherein said message-specific service details is acquired from a database based on the request message.

17. A system for routing electronic messages comprising one or more computer servers with computer-readable code for carrying out the following instructions:
 receiving an electronic request message by an Enterprise Service Bus (ESB) from a service consumer;
 determining at the ESB whether said electronic request message is proprietary, wherein a proprietary message either lacks header information or includes header information in format or structure different from a predetermined canonical format;
 when said request message is proprietary, adding header information in said predetermined canonical format to said request message;
 generating a request message list of instructions comprising message-specific service details comprising a route key defining at least a next destination of the message;
 analyzing said list of instructions to determine whether data transformation is required;
 applying data transformation logic to the request message when the data transformation is required; and
 routing said request message to a service provider based on the route key of the request message list of instructions.

18. The system of claim 17, wherein the one or more computer servers, in analyzing the list of instructions, are further configured to:
 analyze the list of instructions to determine whether translation is required; and
 applying translation logic to the request message when the translation is required.

19. The system of claim 18, wherein the one or more computer servers are further configured to:
 receive an electronic response message by the ESB from the service provider, said response message including a response message list of instructions;

analyze said response message list of instructions to determine whether translation is required;
applying translation logic to the response message when required;
analyze said list of instructions to determine whether data transformation is required;
applying data transformation logic to the response message when data transformation is required; and
deliver said response message to said service consumer.

* * * * *